Dec. 5, 1939.   J. DOLZA ET AL   2,182,252
REMOTE CONTROL FOR TRANSMISSION
Filed Aug. 4, 1938   2 Sheets-Sheet 2
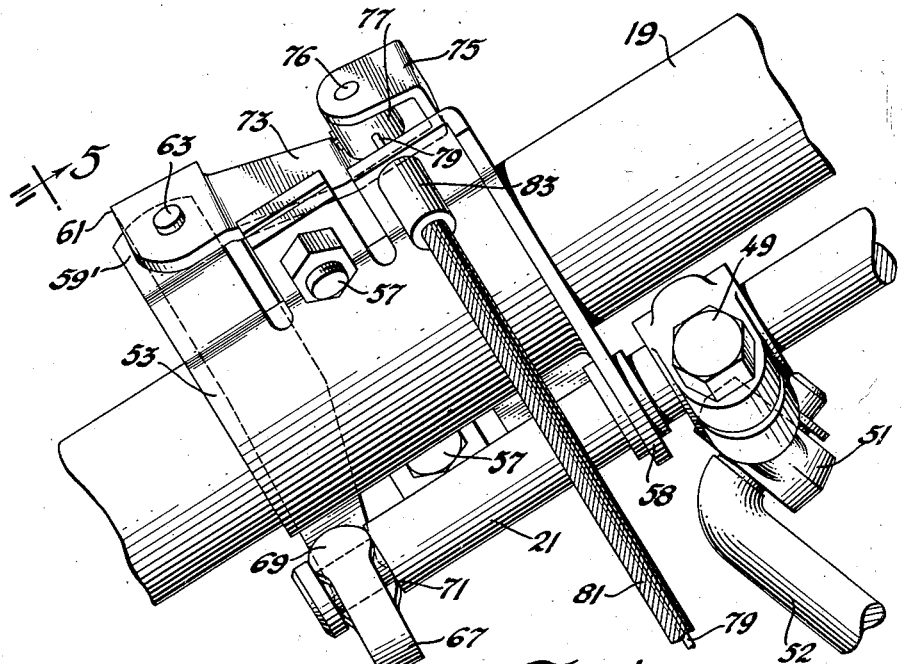
Fig. 4
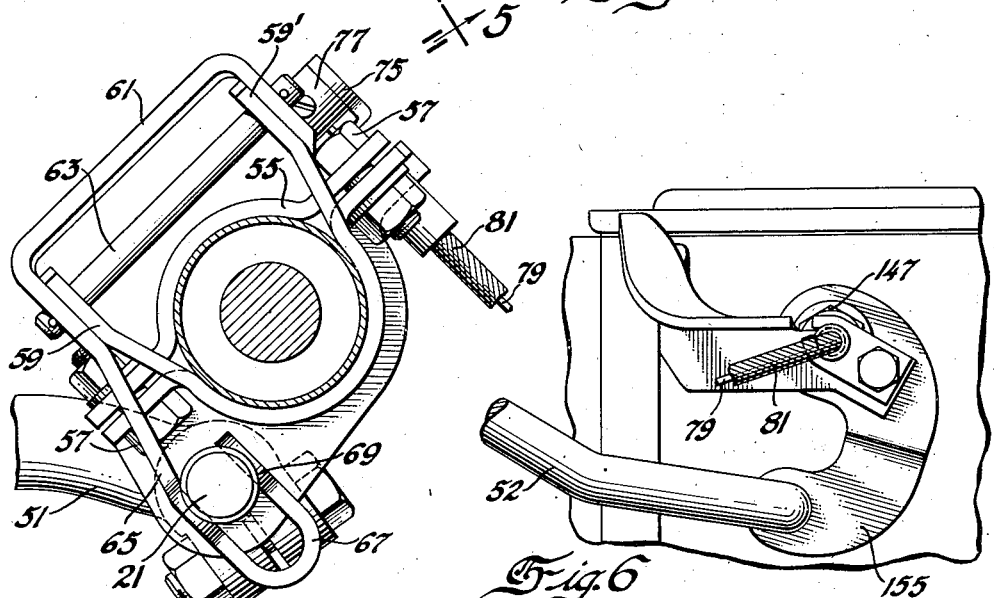
Fig. 5
Fig. 6
Inventors
John Dolza &
Arthur W. Gaubatz
By Blackmore, Sewert & Flint
Attorneys Patented Dec. 5, 1939

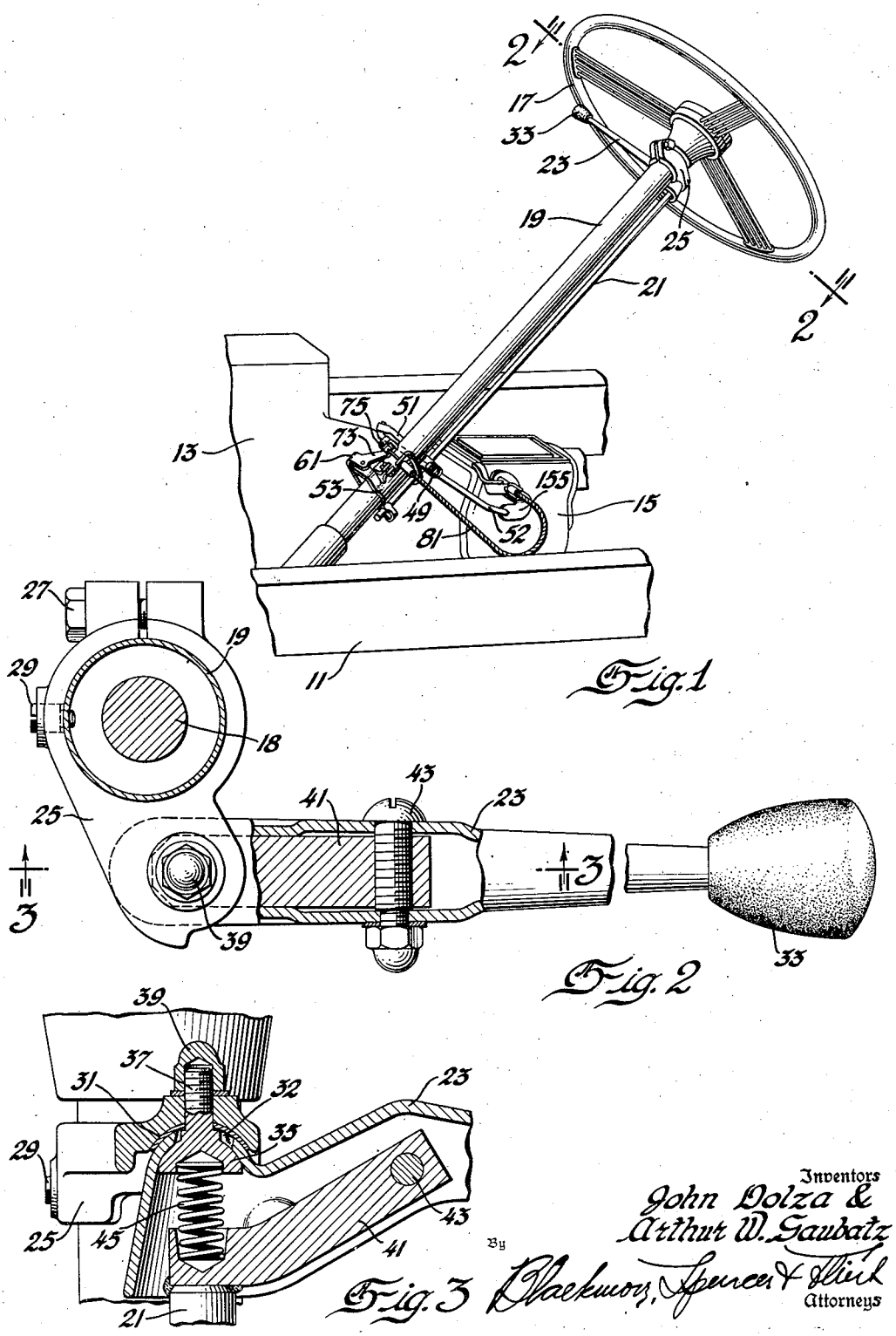

2,182,252

UNITED STATES PATENT OFFICE 2,182,252

REMOTE CONTROL FOR TRANSMISSION

John Dolza and Arthur W. Gaubatz, Flint, Mich., assignors to General Motors Corporation, Detroit, Mich., a corporation of Delaware Application August 4, 1938, Serial No. 222,954

4 Claims. (Cl. 74—484)

This invention relates to change speed mechanism for motor vehicles and has been designed for changing the gear ratio by manually operable means conveniently located for operation. It provides a so-called remote control wherein novel structural arrangements have been made which constitute the subject matter of this application.

An object of the invention is the avoidance of the conventional shift lever extending from the gear box through the floor of the car body.

A further object is the location adjacent the steering wheel of a manually operable lever which performs the function of the conventional shift lever.

The invention is illustrated by the accompanying drawings wherein:

Figure 1 is a view in perspective of the assembly used in making gear ratio changes.

Figure 2 is a view as seen from line 2—2 of Figure 1.

Figure 3 is a section on line 3—3 of Figure 2.

Figure 4 is a view in elevation adjacent the lower end of the steering column.

Figure 5 is a sectional view as seen from line 5—5 of Figure 4.

Figure 6 is a side elevation facing the side wall of the transmission housing.

Numeral 11 shows the frame of a motor vehicle, the engine and the clutch housing being marked 13 and the gear box 15. The hand steering wheel 17 operates a steering post 18 within a fixed steering column 19. Alongside the steering column is a shaft 21 which is mounted to reciprocate and also to rotate on its axis. A lever 23 is used to effect both these movements. As will be explained below, a tilting of the lever serves to make a selection of driving ratios and a rocking of the lever about an axis coincident with the axis of the shaft 21 makes the ratio shifts. Adjacent the top of the steering column 19 is a bracket 25 held clamped to the column by securing means 27 and by retaining means 29. The bracket is formed with a spherical socket 31 which serves as a fulcrum for the tilting and the rocking of lever 23. This hand lever 23 is of channel shape and has a hand grip 33. Its end is shaped as shown in Figure 3 to fit the socket 31. The lever is held within the socket by a suitably shaped head 36 of a bolt 37, the shank of which extends through an enlarged opening 32 in the end of the lever 23 and an opening in the bracket and is held in position by a nut 39. The enlarged opening 32 permits tilting of the lever. The shank of the bolt is in alignment with the axis of shaft 21 as shown in Figure 3. Shaft 21 has secured thereto an angular arm 41. This arm extends between the flanges of lever 23 and is pivoted thereto by pivot means 43. A coil spring 45 between the head 35 and the shaft end of arm 41 biases the shaft 21 to its lowermost position. If lever 23 be tilted upwardly it pivots within the socket 31 and since the arm 41 is pivoted to the lever 23 the shaft 21 is moved upwardly against the tension of spring 45.

Adjacent the lower end of the steering column the shaft 21 has clamped thereto as at 49 the hub of a lever arm 51. At the end of the arm there is attached thereto a link 52. A bracket 53 embraces the column near its lower end and below the arm 51 of shaft 21. This bracket is held by a cap 55 and fastening means 57. The bracket is formed at 58 with a support for the guidance of shaft 21. The bracket has two arms 59, 59' serving to journal a bell crank 61 mounted on a pin 63. The bell crank has one arm 65 provided with a bent end 67. The side of the arm and the bent end are provided with rounded parts 69 which are received within an annular recess 71 near the extreme end of shaft 21. The bell crank has another arm 73 extending upwardly. The extremity of this arm is reversely bent as at 75 and between the arm and the bent end is pivoted at 76 a block 77 to which is attached the end of a flexible cable 79. The cable extends through a cable housing 81, the latter being anchored to the bracket by any convenient means as shown at 83.

The structure within the gear housing by which the shifts are made is not shown for the reason that this structure is not a part of this invention. It will be sufficient to explain that the flexible cable 79 is designed by its axial reciprocation to reciprocate a selector shaft within the gear housing to select one or the other of the conventional shift rails. Only the end of 147 of this selector shaft is shown. The rotation of the selector shaft functions to reciprocate a selected rail. This rotation is made by means of an external lever 155 on said selector shaft and a link 52 connecting said lever and the lever arm 51 on shaft 21. It will be understood that the tilting movements of lever 23 serve to reciprocate shaft 21 and that this reciprocation operates through the flexible cable 79 to reciprocate the selector shaft within the gearing housing whereby it selects one or the other of the two shift rails.

It will also be understood that a subsequent rotation of lever 23 rotates shaft 21 on its axis, which rotation operates through the instrumentality of link 52 to rotate the said selector shaft and axially reciprocate the selected shift rail to thereby obtain the desired driving ratio.

We claim:

1. For operating ratio changing mechanism in a vehicle having a steering column, a shaft in parallel relation to said column, means to journal said shaft adjacent its lower end for rotation and reciprocation, a bracket having a spherical seat adjacent the upper end of the column, a lever having a spherical surface, means to hold said spherical surface in said spherical seat to permit movements of said lever, said shaft having an angle arm rigid therewith and pivoted to said lever whereby the upper end of said shaft is supported by said column through the instrumentality of said lever and whereby said lever may rotate and reciprocate said shaft.

2. For operating ratio changing mechanism in a vehicle having a steering column, a shaft in parallel relation to said column, means to journal said shaft adjacent its lower end for rotation and reciprocation, a bracket having a spherical seat adjacent the upper end of the column, a lever having a spherical surface, means to hold said spherical surface in said spherical seat to permit movements of said lever, said shaft having an angle arm rigid therewith and pivoted to said lever whereby the upper end of said shaft is supported by said column through the instrumentality of said lever and whereby said lever may rotate and reciprocate said shaft, together with yielding means between said holding means and said shaft, to bias said shaft to one position of axial adjustment.

3. In a vehicle having ratio changing mechanism, a housing therefor, a steering column, a shaft alongside said column, means including a lever whereby the upper end of said shaft is positioned, rotated and reciprocated, a bracket adjacent the lower end of said column and secured thereto to support said shaft for rotation and reciprocation, a lever pivoted to said bracket and connected to said shaft, a flexible cable terminally connected to said last mentioned lever and adapted by its reciprocation to reciprocate a selector shaft, and mechanical connections between said first mentioned shaft and an arm on said selector shaft whereby rotation of the latter is effected by rotation of the former.

4. The invention defined by claim 3, said mechanical connections including a lever arm on said first mentioned shaft and a link connecting said arms.

JOHN DOLZA.
ARTHUR W. GAUBATZ.